(12) United States Patent
Oyster et al.

(10) Patent No.: US 6,530,196 B1
(45) Date of Patent: Mar. 11, 2003

(54) SNAP CONNECTOR

(75) Inventors: Brian D. Oyster, Damascus, OH (US); David R. Kerns, Hanoverton, OH (US); Robert C. Holt, Jr., North Canton, OH (US); James G. Stout, Alliance, OH (US)

(73) Assignee: Coastal Pet Products, Inc., Alliance, OH (US)

( * ) Notice: Subject to any disclaimer, the term of this patent is extended or adjusted under 35 U.S.C. 154(b) by 0 days.

(21) Appl. No.: 09/997,695

(22) Filed: Nov. 30, 2001

(51) Int. Cl.[7] ................................................ B68B 1/02
(52) U.S. Cl. .......................... 54/85; 119/792; 24/599.8
(58) Field of Search ...................... 54/85, 24; 119/792; 24/598.4, 601.5, 599.8, 598.1

(56) References Cited

U.S. PATENT DOCUMENTS

| | | | | |
|---|---|---|---|---|
| 272,715 | A | * 2/1883 | Letchworth | 54/85 |
| 1,253,455 | A | * 1/1918 | Adams | 24/598.1 |
| 1,796,698 | A | * 3/1931 | Winslow | 54/24 |
| 2,896,288 | A | * 7/1959 | Davis | 24/323 |
| 3,074,136 | A | * 1/1963 | Looker | 24/165 |
| 3,358,340 | A | * 12/1967 | Higuchi | 24/599.8 |
| 4,774,801 | A | * 10/1988 | Johansen et al. | 119/792 |
| 4,852,336 | A | * 8/1989 | Gammill | 54/24 |

FOREIGN PATENT DOCUMENTS

| | | | | |
|---|---|---|---|---|
| GB | 21047 | * 11/1893 | | 54/34 |
| GB | 11131 | * 6/1900 | | 54/34 |

OTHER PUBLICATIONS

One photograph of a prior art connector distributed by Walsall Hardware Corporation, Skottsdale, Arizona.

* cited by examiner

*Primary Examiner*—Charles T. Jordan
*Assistant Examiner*—Joan M. Olszewski
(74) *Attorney, Agent, or Firm*—Renner, Kenner, Greive, Bobak, Taylor & Weber

(57) ABSTRACT

A connector (10) includes a housing (34) and an arm (43) pivotally connected to the housing (34). A hook (48) is formed on one end of the arm (43) and a spring (49) is positioned between the arm (43) and the housing (34). The connector (10) can be used to attach two items of many configurations together, but it is particularly suited to attach strap ends of an item such as a halter (11) having a strap (12) and a strap (13) interconnected by a plurality of tab straps (20, 21, 22). The strap (12) is interrupted to form a portion (32) carrying the connector (10) and another portion (31) carrying an o-ring (29) which can be engaged between the hook (48) and the housing (34).

9 Claims, 2 Drawing Sheets

SNAP CONNECTOR

TECHNICAL FIELD

This invention relates to an improved snap for quickly connecting or disconnecting two items. The snap is particularly useful to connect or disconnect two straps of a horse halter or the like.

BACKGROUND ART

In many fields, the need exists to quickly connect or disconnect two items such as the end of a pet leash to the collar of a pet, or two straps of a halter for a horse. There has been a universally accepted snap hook which has traditionally been used for such purposes. This hook, which would be carried at the end of one of the items, is j-shaped in configuration having an arm with a hook which is designed to engage the other item formed at one end of the arm. A spring-loaded clasp arm has one end carried at the other end of the arm with its other end being selectively engageable with the open portion of the hook. When engaging an item, the clasp arm is biased against the hook to confine the item within the hook. By applying a force to the clasp arm, it can be moved away from the hook, and the item that was previously being engaged can be removed from the space formed between the clasp arm and the hook.

While these types of snap hooks have served their purpose in many applications for many years, they are not without their problems for at least some applications. In particular, the spring tension on the clasp arm must be strong enough to maintain the item within the hook while at the same time not be so strong as to make it difficult for the user to open the snap. Thus, oftentimes when a quick connecting or disconnecting snap is desirable, the minimal tension on the clasp arm to enable one to perform the task quickly is insufficient to prevent accidental unhooking of the item.

When employed in applications such as to attach the open ends of a horse halter to affix the halter to the horse, such problems are compounded because the junction must be strong, yet the hooking action must take place quickly before the horse determines that it does not want to receive the halter. Moreover, when these snap hooks were first employed on halters, the clasp arm was positioned facing away from the body of the horse. As such, movement of the horse might allow the clasp arm to come into contact with an item, such as the fence of a pasture, which could either open the halter and release the horse, or cause the hook to engage the fence thereby attaching the horse to the fence. As a result of this potential hazard, more recently the snap hooks have been turned around so that the clasp arm is against the body of the horse. However, not only does such a positioning make it harder to move the clasp arm, but also this positioning can cause an irritable rubbing on the body of the horse.

The need exists, therefore, for a snap connector which can be universally used for all applications while at the same time be acceptable for certain specialized applications such as for the halter of a horse.

DISCLOSURE OF THE INVENTION

It is thus an object of the present invention to provide a snap connector which can be quickly and easily operated to connect two items together or to disconnect those items.

It is another object of the present invention to provide a snap connector, as above, which securely engages the items to be connected and yet is operable to connect or disconnect the items with a minimal force.

It is a further object of the present invention to provide a snap connector, as above, which is not susceptible to accidental opening, thereby inadvertently releasing an item.

It is an additional object of the present invention to provide a snap connector, as above, which is readily adaptable for use in horse halters or the like.

It is yet another object of the present invention to provide a snap connector, as above, which when used in a halter does not present a safety hazard to the horse.

It is a still further object of the present invention to provide a snap connector, as above, which when used in a halter does not present an irritant to the horse.

These and other objects of the present invention, as well as the advantages thereof over existing prior art forms, which will become apparent from the description to follow, are accomplished by the improvements hereinafter described and claimed.

In general, an apparatus for connecting a first item to a second item made in accordance with the present invention includes a housing adapted to be attached to the first item and an arm pivotally connected to the housing. A hook is formed on one end of the arm and a spring is positioned between the arm and the housing to bias the hook end of the arm toward the housing so that the second item may be retained between the hook and the housing.

In accordance with another aspect of the present invention, a connector can be used in conjunction with an animal halter which includes a first strap adapted to be received around the nose and chin of the animal and a second strap adapted to be received around the head and throat of the animal. A plurality of tabs connect the straps, and at least one of the straps is interrupted to form first and second strap ends. The connector is carried by the first strap end and includes a housing and an arm pivotally connected to the housing. A spring is positioned between the arm and the housing to bias the arm so that the second strap end may be maintained between the arm and the housing.

A preferred exemplary snap connector and horse halter made in accordance with the present invention are shown by way of example in the accompanying drawings without attempting to show all the various forms and modifications in which the invention might be embodied, the invention being measured by the appended claims and not by the details of the specification.

PREFERRED EMBODIMENT FOR CARRYING OUT THE INVENTION

Figure 1:
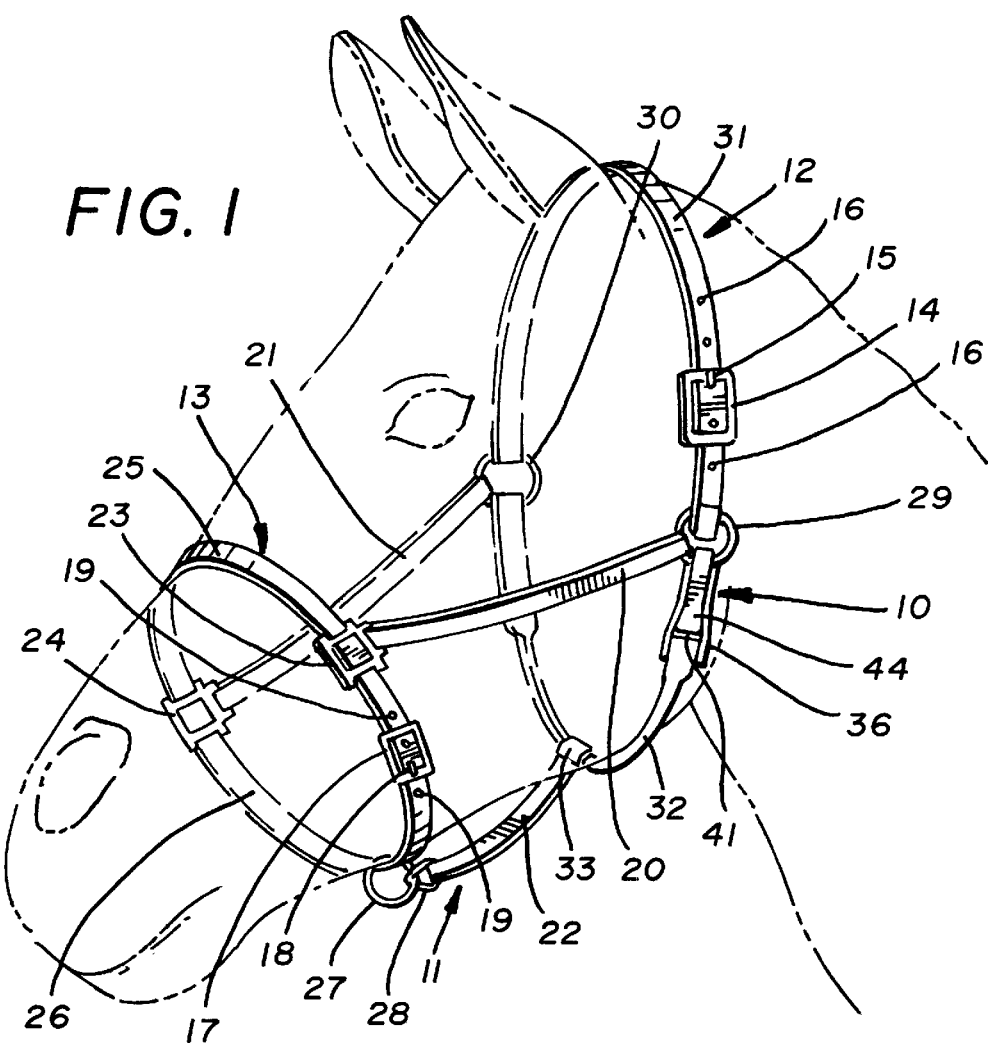
FIG. 1 is a depiction of the head of a horse wearing a halter which is provided with a snap connector made in accordance with the present invention.
Figure 2:
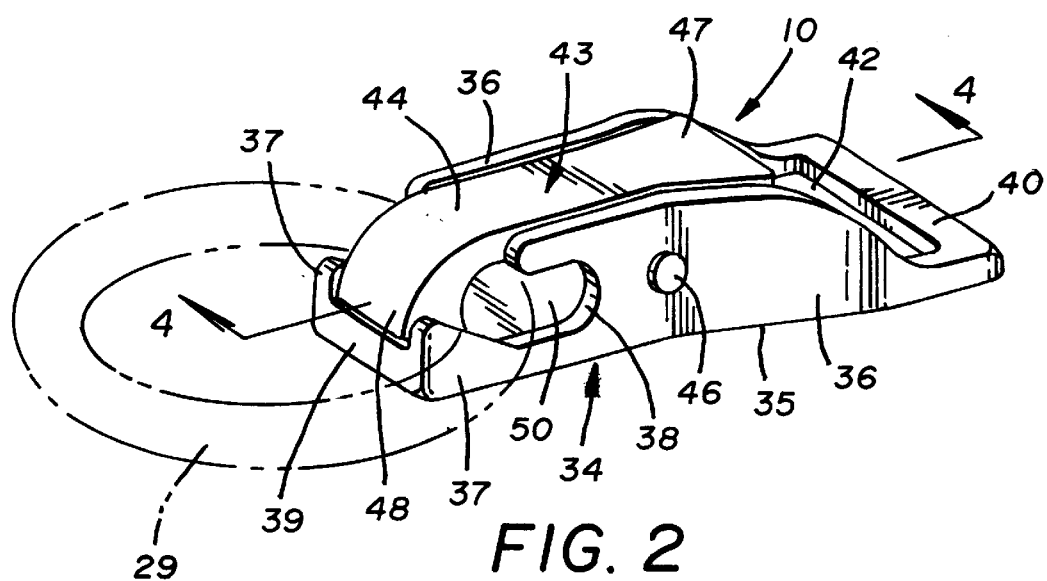
FIG. 2 is a perspective view of a snap connector made in accordance with the present invention and being shown in the closed position.
Figure 3:
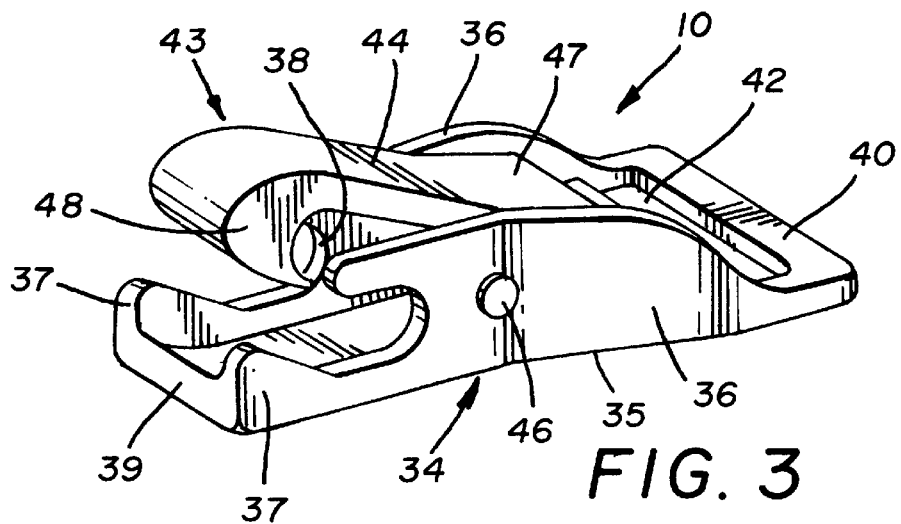
FIG. 3 is a perspective view of the snap connector of FIG. 2 shown in the open position.
Figure 4:
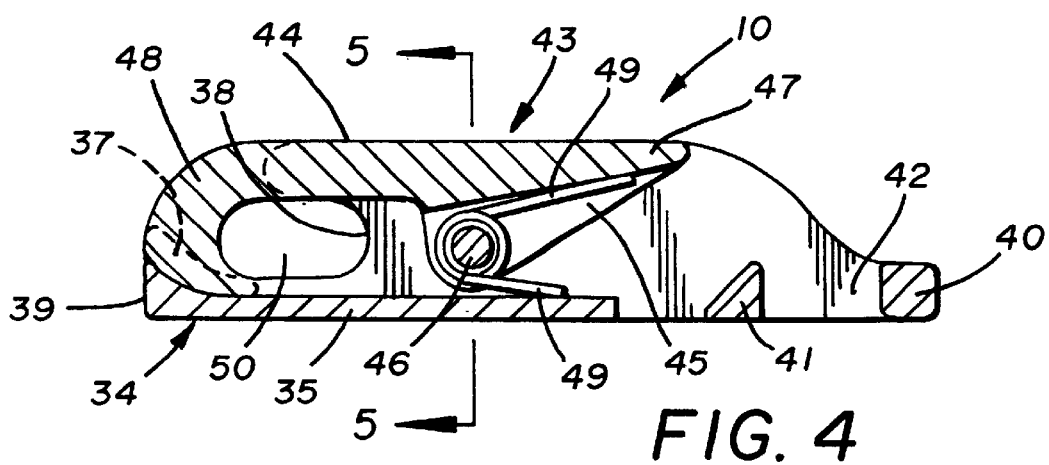
FIG. 4 is a sectional view of the snap connector taken substantially along line 4—4 of FIG. 2.
Figure 5:
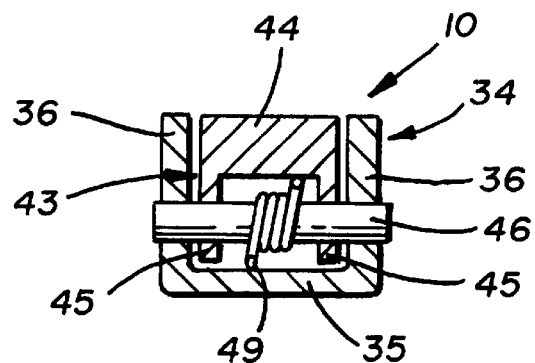
FIG. 5 is a sectional view taken substantially along line 5—5 of FIG. 4.

A snap connector made in accordance with the present invention is generally indicated by the numeral 10 and is shown in FIG. 1 as being utilized in conjunction with a halter, generally indicated by the numeral 11, for a horse. However, as will become particularly evident from the description to follow, snap connector 10 is quite suitable for any application wherein one item is to be connected to another item.

Halter 11 includes a poll and throat strap generally indicated by the numeral 12, and a nose and chin strap generally indicated by the numeral 13. Straps 12 and 13 can be made of any suitable material, such as nylon, leather or the like, which is strong and yet which provides comfort to the horse. The size of strap 12 is rendered adjustable to the size of the horse by means of a buckle 14 having a tongue 15 to be received in a selected one of a plurality of grommet-reinforced holes 16. Similarly, the size of strap 13 is rendered adjustable dependent on the size of the horse by means of a buckle 17 having a tongue 18 to be received in a selected one of a plurality of grommet-reinforced holes 19.

Straps 12 and 13 are interconnected by a series of tab straps which can include opposed cheek tabs 20 and 21 which run along the sides of the face of the horse, and a throat tab 22 which runs under the horse's head generally along its throat. Tabs 20, 21, 22 maintain straps 12 and 13 in a fixed position relative to each other, and they too can be made of any suitable material such as nylon, leather, or the like.

Halter 11 is shown as having several types of mechanisms which attach tabs 20, 21 and 22 to straps 12 and 13, at least some of which may be interchangeable. For example, cheek tabs 20 and 21 are shown as being connected to nose and chin strap 13 by means of three-way halter squares 23 and 24, respectively. Such halter squares allow multiple straps to intersect and be maintained in a fixed position. As such, strap 13 is divided into a nose portion 25 having its ends attached to one side of each halter square 23 and 24 and a chin portion 26 having its ends attached to the opposed side of each halter square 23 and 24. Cheek tabs 20 and 21 then each have one end attached to a third side of halter squares 23 and 24, respectively. These attachments may be accomplished in any conventional manner but usually are created by threading the ends of the straps 20, 21, 25 and 26 through tab openings in halter squares 23 and 24 and then sewing them back on themselves to form loops which thereby engage the sides of halter squares 23 and 24.

An o-ring 27, which is shown to be in the form of a floating o-ring, is provided around chin portion 26 of strap 13, and it carries one end of throat tab 22 by means of a ring 28 carried by that end of tab 22. Ring 28 is shown as preferably being triangular in configuration having one of the intersections of its sides contacting o-ring 27, but it too could be an o-ring or even a d-ring. The connection of the ring 28 to the floating o-ring 27 allows throat tab 22 to center itself on chin portion 26 of strap 13. In addition, a lead (not shown) may be attached to o-ring 27 to enable the horseman to guide or otherwise control the horse.

The other ends of cheek tabs 20 and 21 are attached, as by the loops previously described, to o-rings 29 and 30, respectively. O-rings 29 and 30 divide strap 12 into a poll or head portion 31 and a throat portion 32. Thus, one end of head portion 31 is connected to o-ring 29, and its other end is connected to o-ring 30. Throat portion 32 is shown as being at least in part rounded for comfort and has one end attached to o-ring 30. The other end of throat portion 32 is shown as carrying snap connector 10 which is engaging o-ring 29 and which will be hereinafter described in detail. Throat portion 32 also receives and carries the other end of throat tab 22 via a loop 33 formed at the end thereof.

Halter 11 may be placed on a horse without disturbing the predetermined sizes of straps 12 and 13 as selected by the positioning of buckles 14 and 17, respectively. With snap connector 10 disengaged from o-ring 29, strap 13 is positioned around the nose and chin of the horse and the open strap 12 is positioned so that upon the engagement of o-ring 29 by snap connector 10, as shown in FIG. 1, the halter is properly installed.

Such can be accomplished quickly and safely by snap connector 10, the details of which are shown in FIGS. 2–5. Connector 10 is preferably made of a metallic material and includes a housing, generally indicated by the numeral 34, which includes a generally flat unobstructed base 35 which can rest against the face of the horse without irritating the horse. Opposed sidewalls 36 extend from base 35 and are formed with a lip 37 at one end thereof. A slot 38 is formed rearwardly of the lip 37 in each sidewall 36. An end wall 39 extends from one end of base 35 between lips 37. The other end of base 35 is formed with a crossbar 40 spaced from a second crossbar 41 (FIG. 4) to define a slot 42 therebetween. The end of halter throat portion 32 may be received through slot 42, and it may then loop around crossbar 40 and be sewn back upon itself to form a loop attachment to crossbar 40. As a result, in this manner throat portion 32 carries snap connector 10.

Snap connector 10 also includes a lock arm generally indicated by the numeral 43 which in one position (FIGS. 2, 4 and 5) is totally received within the profile of housing 34. Lock arm 43 includes a faceplate 44 having opposed arms 45 extending downwardly therefrom generally parallel to housing sidewalls 36. A pivot pin 46 is carried between housing sidewalls 36 and is also received through arms 45 of lock arm 43. As a result, lock arm 43 is pivotally carried by housing 34 on pin 46.

Faceplate 44 extends within housing 34 and has a pressure end 47 situated generally adjacent to the end of housing 34 having slot 42, and a hook end 48 situated generally adjacent to the end of housing 34 having lips 37 and end wall 39. A torsion spring 49 is positioned around pin 46 and bears against housing base 35 and pressure end 47 of plate 44 to urge hook end 48 downwardly into housing 34 between lips 37 to form, with slot 38, a generally oval capturing compartment 50.

When in its normal position under the influence of spring 49, faceplate 44 is recessed within, and protected from accidental contact by, housing sidewalls 36. In addition, hook end 48 is positioned within, and protected from accidental contact by, end wall 39 and lips 37, while at the same time forming compartment 50. As such, a connecting member such as o-ring 29 may be captured and securely maintained within compartment 50 thereby attaching one item to another item, such as in the instance shown in FIG. 1, attaching strap head portion 31 to strap throat portion 32. If it is desired to open compartment 50 to permit removal of the item contained therein, or for insertion of an item into compartment 50, one need only to apply downward pressure to pressure end 47 of faceplate 44 to overcome the bias of spring 49 and move lock arm 43 from the FIG. 2 to the FIG. 3 position. As is clearly evident from FIG. 3, slot 38 is now open and an item such as o-ring 29 can be readily removed from or inserted into snap connector 10.

In view of the foregoing, it should be evident that a snap connector constructed as described herein can quickly and easily attach items to each other or detach items from each other, such as the components of a horse halter or the like, thereby accomplishing the objects of the invention and otherwise substantially improving the art.

What is claimed is:

1. A halter comprising a first strap adapted to be received around the nose and the chin of an animal; a second strap adapted to be received around the head and the throat of an animal; a plurality of tabs connecting said straps, at least one of the straps being interrupted to form a first strap end and a second strap end; a connector carried by said first strap end, said connector including a housing, said housing having a slot, an arm pivotally connected to said housing, said arm having a hook, said slot as viewed in profile forming with said hook a compartment to confine said second strap end, and a spring between said arm and said housing to bias said arm to a closed position so that said second strap end may be maintained in said compartment with said arm being totally within the profile of and protected by said housing.

2. The halter of claim 1 further comprising a pin carried by said housing, said arm being pivotable relative to said housing on said pin.

3. The halter of claim 2 wherein said pin is positioned between the ends of said arm so that engaging one end of said arm moves the other end of said arm away from said housing.

4. The halter of claim 1 wherein said housing includes a crossbar at one end thereof, said first strap end having a loop received around said crossbar.

5. The halter of claim 1 wherein said housing includes a base and opposed sidewalls extending away from said base.

6. The halter of claim 5 wherein said arm is positioned between said sidewalls and within the profile of said sidewalls when said spring is biasing said arm toward said housing.

7. The halter of claim 5 further comprising a pin extending between said sidewalls and carrying said arm.

8. The halter of claim 7 wherein said spring is carried by said pin.

9. The halter of claim 1 further comprising a buckle to adjust the size of said first strap and a buckle to adjust the size of said second strap.

* * * * *